Patented Jan. 4, 1949

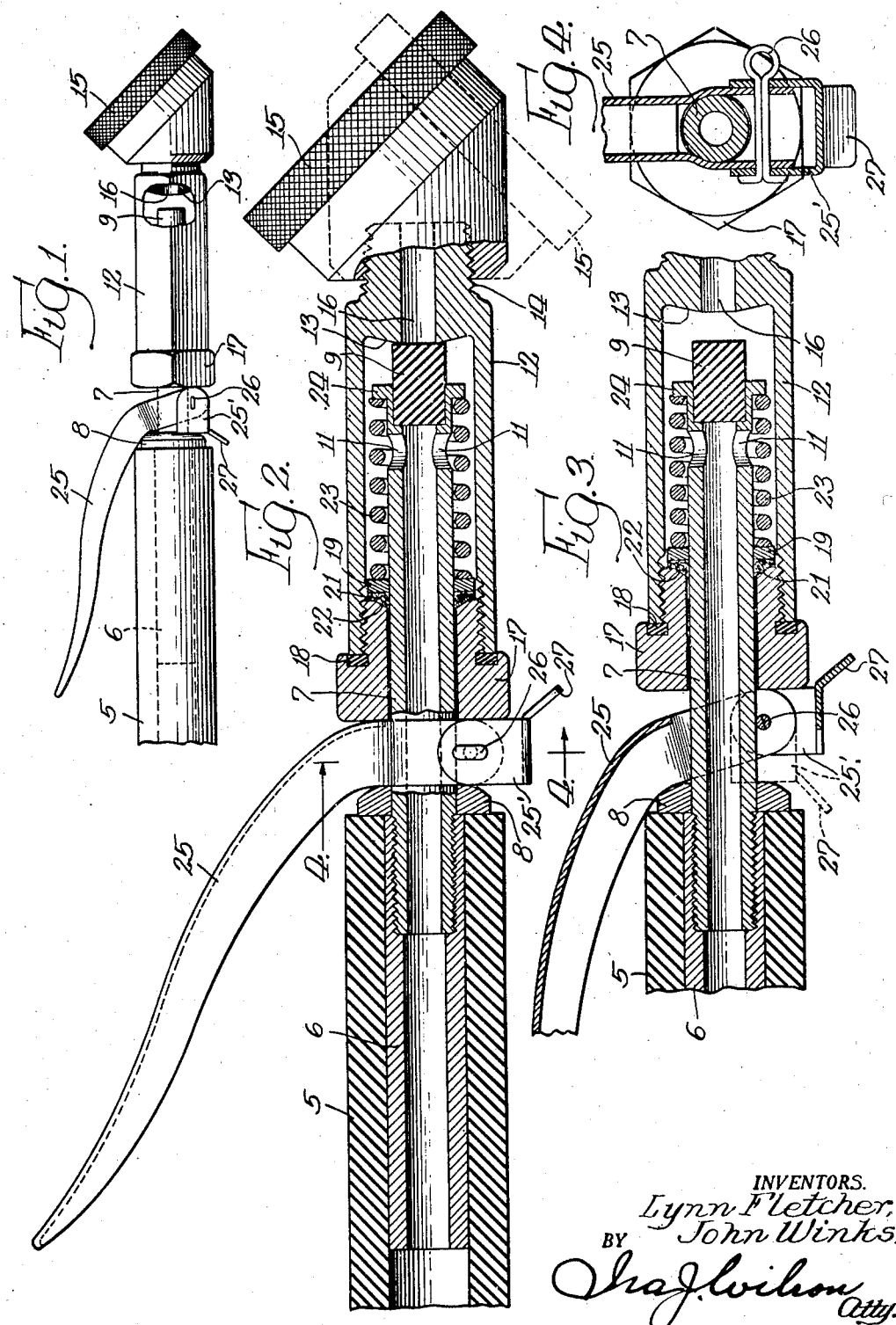

2,457,993

UNITED STATES PATENT OFFICE 2,457,993

SPRAYING DEVICE

Lynn Fletcher and John Winks, Lowell, Mich., assignors to Lowell Specialty Company, Lowell, Mich., a corporation of Michigan Application July 20, 1944, Serial No. 545,773

3 Claims. (Cl. 251—134)

This invention relates to spraying devices which constitute part of the equipment of sprayers designed for the spraying of such insecticides and the like as are ordinarily handled by compressed air sprayers.

In sprayers of this type the nozzle is usually mounted on the end of the shut-off, which in turn is connected with a flexible hose through which the spraying material is delivered from a tank or suitable receptacle. The nozzle is customarily threaded onto the shut-off device and, if it be desirable to change the direction of discharge, such result can be attained only by twisting the entire device including the hose, or by partially unthreading the nozzle from the shut-off device. The twisting action is very tiring to the operator and the partial unthreading is objectionable because the threads soon become worn so that the nozzle will not remain in its adjusted position.

One of the purposes of the present invention is to provide a device having a shut-off valve body rotatably mounted upon the tube through which the spray material is delivered, so that the body with the nozzle fixedly mounted on its outer end may be adjusted to direct the nozzle discharge in any desired direction by simply turning the body on the tube.

Another purpose is to provide a device of the character indicated in which the rotatably adjustable nozzle-carrying body will be frictionally but yieldably retained in the desired adjusted position.

A further object of the invention is to provide a device of the character indicated which will automatically and effectually seal itself against leakage of the spraying fluid and which can be easily and readily manipulated manually to deliver a spraying fluid at a controlled rate of flow.

An additional object is the provision of a novel latching device which will hold the shut-off in open position so as to cause the delivery of a constant and uniform spray and which can be readily moved from latching to unlatching position and vice versa by the thumb of the hand which grasps the hose and control handle to direct the spray from the nozzle.

Other objects and many of the inherent advantages of this invention should be readily appreciated as the same becomes better understood by reference to the following description when considered in connection with the accompanying drawing.

Referring to the drawing,

Fig. 1 is an elevation partially broken away of a spraying device embodying the present invention;

Fig. 2 is an enlarged longitudinal sectional view of the device shown in Fig. 1, but with the shut-off closed;

Fig. 3 is a fragmentary view similar to Fig. 2, showing the shut-off open; and

Fig. 4 is a sectional view on the line 4—4 of Fig. 2.

Referring to the drawings more in detail, reference character 5 indicates the free end of a flexible conduit, such as a rubber hose, for instance, which is connected to receive a supply of liquid spray material from a suitable container, such as the tank of a large size sprayer or the smaller receptacle of a manually operable sprayer.

The end portion of the hose is equipped, as is customary, with a metal tube 6 which stiffens the hose and provides in effect a handle which may be grasped by the operator in the manipulation of the device. An extension in the form of a tube 7 is threaded into the outer end of tube 6, and a fulcrum washer 8 surrounds the tube 7 adjacent the end of the hose.

At its outer end tube 7 is equipped with a valve 9 in the form of a solid block of yieldable material similar to rubber, but resistant to attack or deterioration by the spraying material. A synthetic material resembling rubber, commercially known as "Duprene" has been found to be very suitable for the purpose. Transverse openings 11 in the walls of the tube 7 adjacent the inner end of the valve 9 afford an outlet for the spraying material from the interior of the tube 7.

A valve body 12 of generally cylindrical shape, but preferably having a non-circular exterior, is provided near its outer end with a tapered valve seat 13 adapted to snugly seat against the valve 9 to serve as a shut-off for the spray fluid. The outer end of this body is taper threaded as indicated at 14 for the mounting thereon of a nozzle 15 of well known construction, the nozzle being adapted to be snugly threaded onto the body to remain in fixed relation thereto, a bore 16 conducting the spraying material from the valve seat to the nozzle. The opposite or inner end of the valve body is tapped to receive a threaded closure plug 17 which is provided with an inset washer or gasket 18 against which the end of the body abuts to provide a leak-proof seal.

A packing gland comprising a ring or washer 19 and suitable compressible packing 21 serves to prevent leakage around the perimeter of the tube 7. The inner end of the plug 17 is cupped, as indicated at 22, to receive the packing and hold it under pressure snugly against the perimeter of the tube 7. This gland is maintained under pressure by a coiled expansion spring 23 interposed between the ring 19 and a flange 24 formed on the outer end of tube 7. The spring performs the triple functions of compressing the packing gland around the tube 7, holding the seat 13 in sealing engagement with the valve 9 and providing a frictional resistance to rotation of the body 12 on the tube 7 which retains the body and nozzle in the position to which they have been rotatably adjusted.

For the purpose of imparting longitudinal movement to the body 12 to open the shut-off by unseating the seat 13 from the valve 9, a handle 25 is provided which is bifurcated at its operating end to straddle the tube 7 between the washer 8 and the head 17 of the body 12. Normally the handle assumes the position shown in Fig. 2 under the action of the spring 23.

In using the device the operator holds the end of the hose 5 in his hand with his fingers grasping the handle 25 so that by compression the handle may be swung from the position of Fig. 2 to that shown in Fig. 3, thereby projecting the body 12 away from the washer 8 and against the force of the spring 23 to withdraw the seat 13 from the valve 9, thereby permitting the delivery of spray liquid from the nozzle.

In the event that it becomes desirable to latch the shut-off in open position to permit a continuous and uniform discharge from the nozzle, this may be accomplished by moving U-shaped latch 25' from the normal projected position shown in Fig. 2 to the dotted line position shown in Fig. 3 where it engages the outer face of the washer 8. The latch 25' is pivoted on the projecting bifurcations of the handle 25 by means of a cotter pin 26 extending through the legs of the latch and the extensions of the handle. A thumb piece 27 projecting from the outer corner of the latch is positioned to be engaged by the thumb piece 27 projecting from the outer corner of handle, whereby the latch may be moved into operative or inoperative position, as the case may be.

It should be apparent from the foregoing that this structure affords provision for adjusting the direction of discharge of the nozzle by a rotative movement of the body 12 about the tube 7, and that when adjusted to deliver in the desired direction the body will be retained against further or accidental rotative movement by the action of the spring 23. It will also be apparent that by manipulation of the handle 25 the body 12 may be longitudinally positioned to open the shut-off any desired amount, so that the discharge of spraying material from the nozzle may be regulated as desired. Furthermore, the thumb operable latch may be readily moved into either operative or inoperative position, as occasion requires, without interfering with the holding of the device in the hand of the user.

The structural details illustrated and described may be varied within considerable limits without departing from the essence of the invention as defined in the following claims.

We claim:

1. In a spraying device, the combination of a tube, a valve carried thereby, a body surrounding the tube and provided with a seat adapted to engage said valve, said body being longitudinally movable on the tube to open and close said valve and also rotatable with respect to the tube, spring means interposed between the tube and the body for holding said seat against said valve, a fulcrum member mounted on the tube in spaced relation to said body a handle having a bifurcated end portion straddling said tube between said fulcrum member and said body, said handle being arranged to contact said fulcrum member and said body when actuated whereby said body may be moved against the force of said spring to open said valve, a thumb latch carried by said bifurcated end of said handle for latching said body in open valve position, and a single pin extending through said handle and said latch for holding the handle on said tube and pivoting said latch on the handle.

2. In a spraying device, the combination of a tube, a block of yieldable material adapted to serve as a valve carried by said tube, a body surrounding the tube and spaced therefrom and provided with a valve seat adapted to engage said block, and a bore extending from said seat to the outer end of the body through which liquid delivered from the tube is discharged, said body being rotatable about and longitudinally movable with respect to said tube and seat, a spring normally urging said seat against said block, a handle having a bifurcated end portion straddling said tube at the inner end of the body and in engagement therewith, a member mounted on the tube at the opposite side of the handle to serve as a fulcrum for the handle to enable longitudinal movement of the body for opening the valve to be effected by manipulation of the handle about said fulcrum, a pin extending through the spaced legs of the handle whereby the handle is retained in position, and a thumb latch pivoted on said pin and adapted to be moved into abutting relation with said fulcrum whereby the body may be latched in valve-open position.

3. The device defined in claim 2, in which the thumb latch is U-shape in form and is provided with an operating thumb piece projecting outwardly therefrom in position to be manipulated.

LYNN FLETCHER.
JOHN WINKS.

REFERENCES CITED

The following references are of record in the file of this patent:

UNITED STATES PATENTS

| Number | Name | Date |
|---|---|---|
| 450,679 | Perkins | Apr. 21, 1891 |
| 743,895 | Lendh | Nov. 10, 1903 |
| 1,011,314 | Canner | Dec. 12, 1911 |
| 1,380,950 | Fornwalt | June 7, 1921 |
| 1,580,828 | Harvey | Apr. 13, 1926 |
| 2,043,477 | Imschweiler | June 9, 1936 |
| 2,048,858 | Gibbs | July 28, 1936 |
| 2,208,850 | Mayer | July 23, 1940 |
| 2,281,142 | Davis | Apr. 28, 1942 |

Certificate of Correction

Patent No. 2,457,993.

January 4, 1949.

LYNN FLETCHER ET AL.

It is hereby certified that error appears in the printed specification of the above numbered patent requiring correction as follows:

Column 3, lines 43 and 44, strike out the words "piece 27 projecting from the outer corner of handle" and insert instead *of the hand which grasps the hose and the handle*;

and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*